US006262886B1

(12) United States Patent
DiFonzo et al.

(10) Patent No.: US 6,262,886 B1
(45) Date of Patent: Jul. 17, 2001

(54) TRANSLUCENT PROTECTIVE COVERING FOR A COMPUTER HOUSING

(75) Inventors: John C. DiFonzo, Emerald Hills; Lawrence Lam, San Jose; Roy Riccomini, Campbell; Christopher J. Stringer, Pacifica; Stephen P. Zadesky, Mountain View, all of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/410,188

(22) Filed: Sep. 30, 1999

(51) Int. Cl.[7] .............................. H05K 5/00; G06F 1/16; H04N 7/00
(52) U.S. Cl. ...................... 361/683; 361/681; 361/682; 364/208.1; 345/905; 348/794
(58) Field of Search .................................. 361/683, 681, 361/682–686, 724–727; 364/208.1; D14/100, 113, 114, 115; D9/415, 457; 345/169, 905; 348/794, 552; 248/917–924

(56) References Cited

U.S. PATENT DOCUMENTS

| D. 374,662 | * | 10/1996 | Soderburg | D14/106 |
|---|---|---|---|---|
| D. 382,547 | * | 8/1997 | Soderburg | D14/106 |
| D. 395,288 | * | 6/1998 | Soderburg | D14/106 |
| 4,497,036 | * | 1/1985 | Dunn | 364/708 |
| 4,742,478 | * | 5/1988 | Nigro, Jr. et al. | 364/708 |
| 4,847,798 | * | 7/1989 | Kurashima | 364/708 |
| 5,208,736 | * | 5/1993 | Crooks et al. | 361/393 |
| 5,243,549 | * | 9/1993 | Oshiba | 364/708 |
| 5,751,544 | * | 5/1998 | Song | 361/681 |
| 5,764,474 | * | 6/1998 | Youens | 361/680 |
| 5,786,095 | * | 6/1998 | Nakamura et al. | 361/681 |
| 5,796,576 | * | 8/1998 | Kim | 361/681 |
| 6,040,811 | * | 3/2000 | Malhi | 345/87 |

FOREIGN PATENT DOCUMENTS

| 4-65706 | * | 3/1992 | (JP) | G06F/1/20 |
|---|---|---|---|---|
| 6-43966 | * | 2/1994 | (JP) | G06F/1/16 |
| 10-124175 | * | 5/1998 | (JP) | G06F/1/16 |

* cited by examiner

Primary Examiner—Leo P. Picard
Assistant Examiner—Anatoly Vortman
(74) Attorney, Agent, or Firm—Richard C. Liu

(57) ABSTRACT

The present invention includes a portable computer having improved resistance to scratching, marring and general abuses that include shock and vibration. The computer has a computer housing that includes a display housing and a main housing. A portion integral to one side of the display housing and that portion being proximal to an operating user has an integral layer of translucent elastomer having elastic properties of materials such that of natural rubber. One side of the main housing includes a location for keyboard placement, a palm rest and a cursor-pointing device. Another side of the main housing makes contact with a generally flat surface when the computer is in use. A portion integral to that side of the main housing also includes a layer of translucent elastomer. The configuration of the translucent elastomers on the computer housing is such they cover at least the corners of the portable computer that are proximal to the operating user.

One aspect of the present invention includes a translucent elastomer covering ore or more parts of the computer housing on which user hand or fingers frequently make contact. Another aspect of the present invention includes translucent elastomers having a color such as tangerine, blueberry, strawberry, lime, a grape or a combination of colors.

16 Claims, 3 Drawing Sheets

TRANSLUCENT PROTECTIVE COVERING FOR A COMPUTER HOUSING

TECHNICAL FIELD

This invention relates to computer housing of a portable personal computer. More particularly, it is related to such computer housings that provide impact-attenuating features for improved resistance to general abuses including shock and vibration.

BACKGROUND ART

In portable computers, commonly referred to as laptop or notebook computers, there is each a computer housing typically made of plastics, lightweight in character, and it typically consists of a display housing and a main housing. The display housing supports and contains a computer display and its associated electronics, and the main housing supports and seats computer processing electronics and various interface devices. For example, the main housing may contain a CPU, memory modules, a hard disk drive, a floppy drive and a PCMCIA drive. The display and main housings are structurally molded in a manner to suitably encase the various components of the portable computer. Furthermore, the display housing is typically rotatably mounted to the main housing via hinges so that when in use, a user may work with the portable computer in its opened position, and also that the user may easily carry it for transport in its closed position. A latch may be provided to further secure the two housings in the closed position.

On the one hand, a well-known objective for computer housing construction is to minimize weight. Portable computers have been primarily designed to be hand-carried, to be light in weight and to be operated under various environmental conditions, for example, in airplanes, trains, buses, boats, etc. As a result, the computer housings are typically thin and made of lightweight materials. On the other hand, Fin materials are not ideal when in view of the fact that the computer housing of a portable computer is typically subjected to harsher environment than that of a desktop computer. In other words, the likelihood that the portable computer will be dropped, scratched, marred, deformed or generally abused is much higher than for the desktop computer.

In addition, it is well known that vibration and shock may cause system failure. Vibration experienced by a typical computer system includes that which is caused by mechanical and moving parts such as hard disk drives. For example, worn or damaged disk drive bearings is a source of undesired vibration. If un-impeded, such internal vibration may easily resonate with the computer external environment (e.g., table, etc.) through the computer housing. As a result, the many undesirable consequences of vibration may be amplified to include the shaking apart of solder joints and the fatiguing of computer electronic components. Shock is another adverse condition that can cause the computer system to malfunction. Sudden shock may be caused by impact between the computer housing and another object. Again, if un-impeded, a sudden shock may deform the housing or may cause the electronic components to be loosened whereby causing damage to the entire computer system.

On common solution is to stow the computer inside a padded carrying case. However, the padded case provides little or no protection once the computer is removed during use. Other existing 'ruggedized' computers that provide protection against above-mentioned potential computer housing abuses tend to have very thick, heavy, bulky and unappealing computer housings.

Therefore, it is desirable to provide a portable personal computer having an improved computer housing wherein the housing has impact-attenuating features for improved resistance to scratching, marring and general abuses that include shock and vibration. Furthermore, it is desirable for such improved computer housing to be thin in structure, light in weight, slim in shape and appealing to users.

SUMMARY OF THE INVENTION

The present invention includes a portable computer having improved resistance to scratching, marring and general abuses that include shock and vibration. The computer has a computer housing that in turn includes a display housing and a main housing. The display housing is rotatably attached to the main housing via a hinge mechanism. This mechanism includes at least one hinge so that when in use, a user may work with the portable computer in its opened position, and also that the user may easily carry it for transport in its closed position.

The display housing further has an opened side and a closed side. The opened side includes an aperture appropriately configured for seating a display screen. Whereas a portion integral to the closed side, being distal to the hinge mechanism and being proximal to an operating user, that portion includes a layer of translucent elastomer that has elastic properties of materials such that of natural rubber. The main housing also has an opened side and a closed side. The opened side includes a location for keyboard placement, a palm rest and a cursor-pointing device. The closed side of the main housing makes contact with a generally flat surface when the computer is in use. A significant portion integral to the closed side of the main housing also includes a layer of translucent elastomer. As a result, these integrally disposed translucent elastomer layers on the computer housing both being distal to the hinge mechanism and both being proximal to the operating user, these layers form the protective coverings for the portable computer so to provide improved resistance to general abuses including vibration and shock. And these elastomers integrally layered in accordance with the present invention accomplish the advantages of the present invention with minimal costs, and high aesthetics values.

One aspect of the present invention includes a translucent elastomer covering one or more parts of the computer housing on which user hand or fingers frequently make contact. For example, these parts include key caps of the keys in the keyboard, frequently used portions of the palm rest, a command select button for the cursor-pointing device and a carrying handle for ease of transport. This aspect of the invention advantageously prevents accidental scratching and marring by user hand or fingers.

Yet another aspect of the present invention includes translucent elastomers having a color such as tangerine, blueberry, strawberry, lime and grape or a combination of colors.

BRIEF DESCRIPTION OF THE DRAWINGS

A better understanding of the present invention can be obtained by considering the following detailed description taken together with the accompanying drawings that illustrate a preferred embodiment of the present invention in which.

DETAILED DESCRIPTION OF THE PREFERRED EMBODIMENTS

With today's advances in computer housing technology, any computer housing designs generally do not require the rendering of fully detailed implementation specifications. The definition of sufficient mechanical functionality would allow those skilled in the art to design the desired computer housing implementations. Accordingly, functionality will be described in detail with the accompanying drawings. Those of ordinary skill in the art, once given the following descriptions of the various aspects of the present invention will be able to implement the necessary mechanical arrangements in suitable technologies without undue experimentation.

Reference will now be made in detail to a preferred embodiment of the present invention. While the invention will be described in conjunction with the preferred embodiment, it will be understood that they are not intended to limit the invention to the disclosed embodiment.

Figure 1:
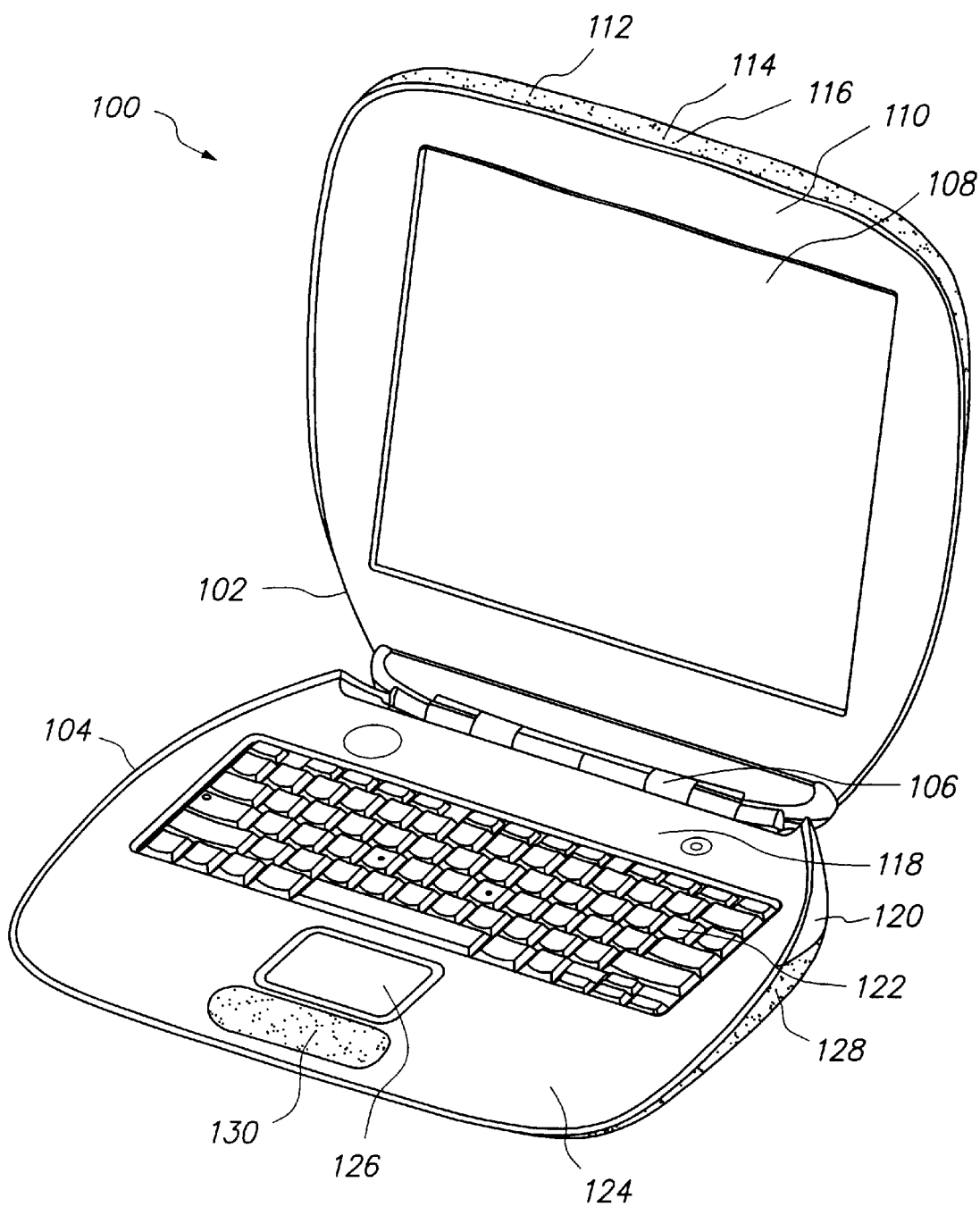
FIG. 1 is a perspective view of a portable computer in a opened position illustrating a preferred embodiment having a translucent protective covering in accordance with the present invention.
Figure 2:
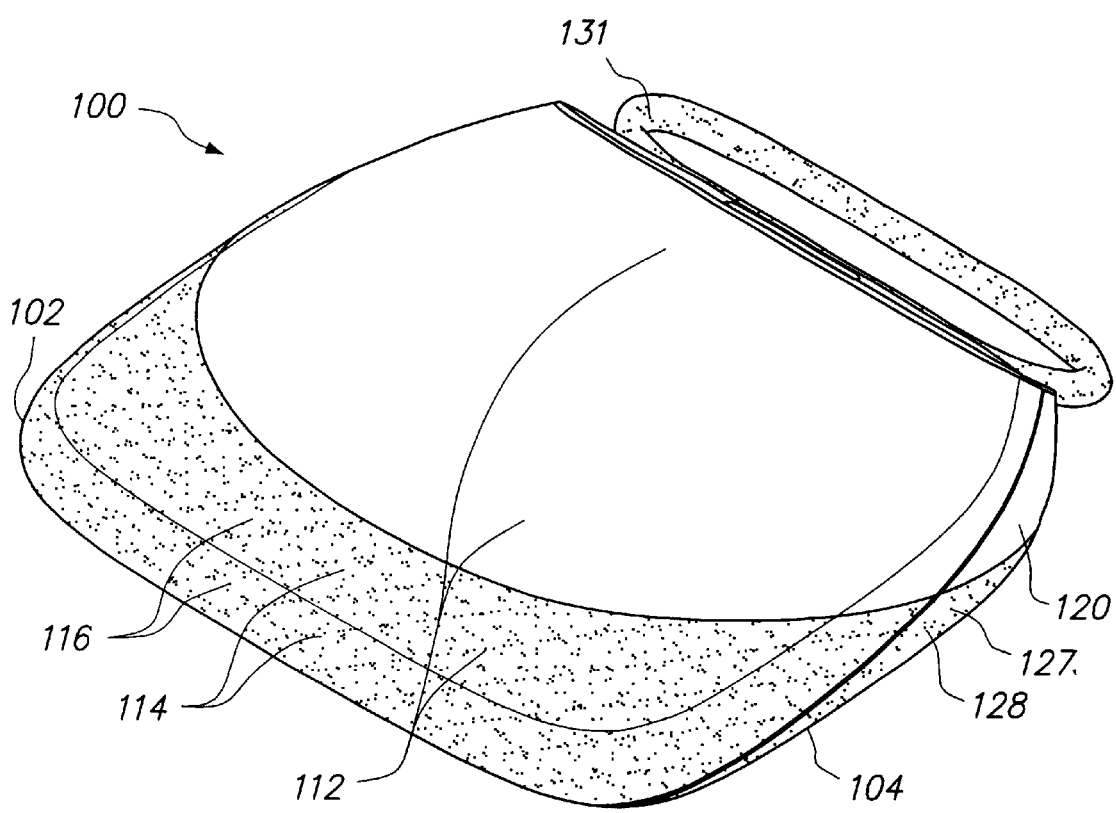
FIG. 2 is a perspective view of the portable computer in the closed position primarily illustrating the closed side of the display housing of the preferred embodiment in accordance with the present invention.
Figure 3:
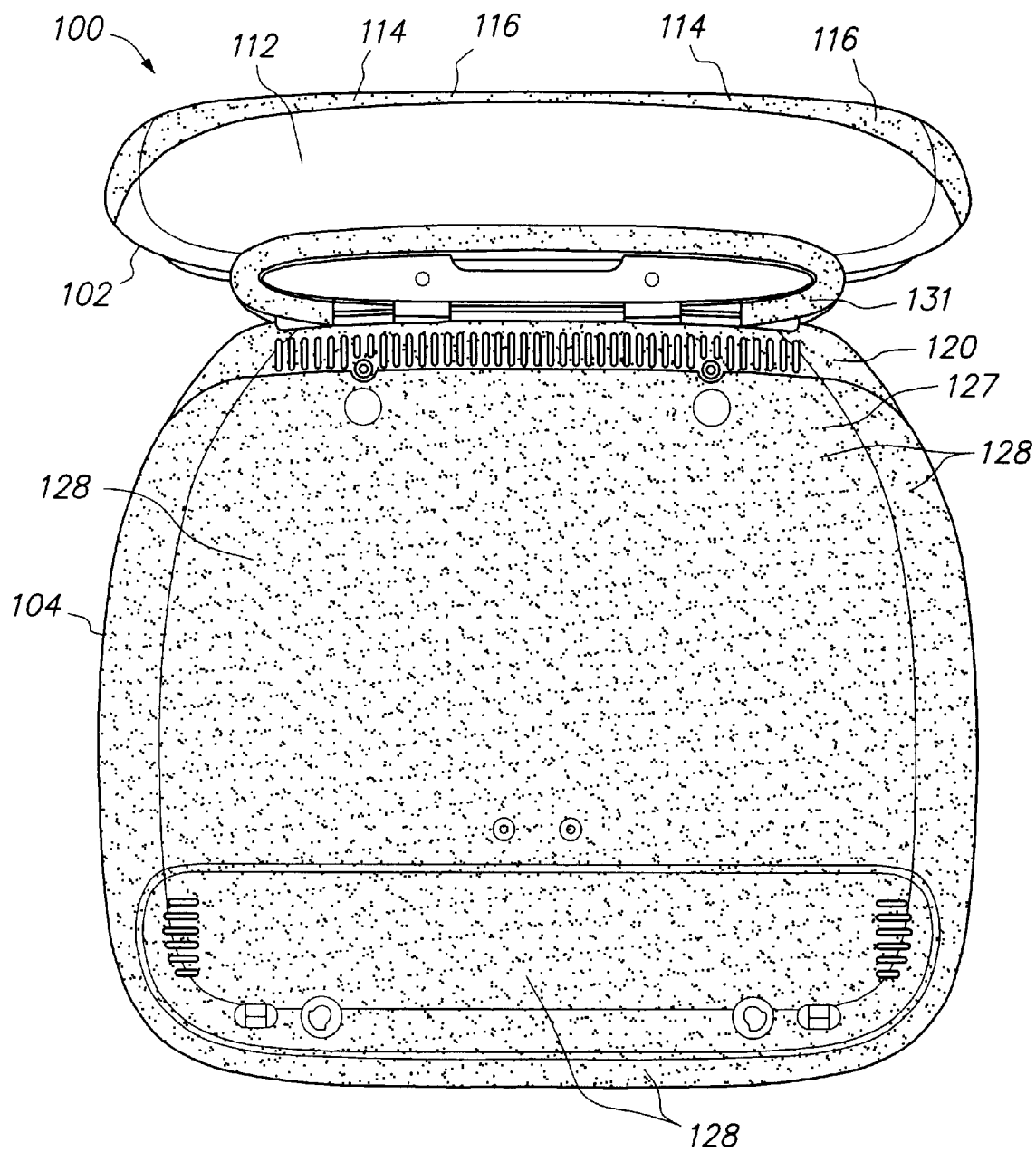
FIG. 3 is a bottom view of the portable computer in the opened position primarily illustrating the closed side of the main housing of the preferred embodiment in accordance with the present invention.

FIG. 1, FIG. 2 and FIG. 3 show the various views of a portable computer 100 in accordance with the present invention. They also depict general views of an iBook® computer as marketed and sold by Apple Computer, Inc. The portable computer 100 has a display housing 102 and a main housing 104. Preferably, the housings 102,104 may be made of lightweight, translucent and hardened plastic materials. A preferred plastic material is sold under the trade name GE® Polycarbonate ML7408. The display housing 102 is rotatably attached to the main housing 104 via a hinge mechanism 106. A preferred hinge mechanism includes two hinges. As a result of the hinge mechanism 106, a user may work with the portable computer 100 in its opened position, and also that the user may easily carry it 100 for transport in its closed position.

The display housing 102 includes an opened side 110 and a closed side 112. On its opened side 110, there is an aperture appropriately configured to allow the seating of a display screen 108. The display housing 102 further includes therein among other things electronics associated with image display. On its closed side 112, a curved portion 114 integral to the display housing is layered with a translucent elastomer 116 for improved resistance to scratching, marring and general abuses. The curved portion 114 is preferably disposed distal to the hinge mechanism 106 so that to include the corners of the display housing 102 proximal to users. Other than that, the curved portion 114 may be of any aesthetic styles.

The translucent elastomer 116 may be materials having elastic properties like those of the natural rubber. Preferably, it 116 is further selected to be sufficiently elastic so that the material is able to efficiently dampen internal vibration and to absorb external shock. At the same time, the elastomer is to be sufficiently durable to prevent typical scratches and marring due to general computer abuse in the most frequently occurring areas of the computer housing. A preferred elastomer 116 is a polyester-based or polyether-based material, and it is layered onto and combined with the closed side 112 to form an integral piece.

The main housing 104 also has an opened side 118 and a closed side 120. The opened side 118 includes a location for a keyboard 122, a palm rest 124 and a cursor-pointing device 126. The closed side 120 of the main housing 104 makes contact with a generally flat surface when the computer is in use. A portion 127 integral to the closed side 120 of the main housing 104 also includes a layer of translucent elastomer 128. Although the elastomer coverage on the main housing is preferred to be substantial, this layer should cover at least the contact points between the portable computer 100 and the generally flat surface on which the computer 100 sits. Further, the translucent elastomer 128 here and the elastomer 116 on the display housing 102 may be clear without a color or in a selected color. Each of the Apple® iBook® computers has translucent protective elastomer coverings in one of the five colors, namely, tangerine, blueberry, strawberry, lime, and grape. It is further disclosed that each portable computer may have elastomer protective covering in a combination of colors.

The protective coverings on the display and main housings 102,104 are such that the portions 114,127 of the closed sides 112,120 of the computer housings 102,104 and being distal to the hinge mechanism 106 are integrally layered with the translucent elastomers 116,128. FIG. 2 illustrates the archial elastomer design for the portable computer 100 where the protective coverings on the portions 114,127 cut across the display and main housings 102,104 in a generally archial manner. And these elastomers 116,128 integrally layered in accordance with the present invention accomplish the advantages of the present invention with minimal costs, and high aesthetics values.

A further aspect of the preferred embodiment may include a translucent elastomer (not shown in the drawings) covering one or more parts of the housings 102,104 on which user hand or fingers frequently make contact. For example, these parts include portions of key caps of the keys in the keyboard 122, portions of the palm rest 124, a command select button 130 for the cursor-pointing device 126 and a carrying handle 131 for ease of transport. This aspect of the invention advantageously prevents accidental scratching by user hand or fingers.

While the present invention has been described in terms of a preferred embodiment, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

We claim:

1. A portable computer having a computer housing for improved resistance to scratching, marring and general abuses, said portable computer housing having a display housing rotatably attached to a main housing via a hinge mechanism, said portable computer comprising:

said display housing having a closed side wherein the closed side being consisting of an integral piece, said closed side further having a first translucent elastomer layer integrated with a portion of the closed side and that portion being distal to the hinge mechanism;

said main housing having an opened side and a closed side wherein the closed side of the main housing being consisting of an integral piece, said closed side of the main housing further having a second translucent elastomer layer integrated with a portion of the closed side of the main housing and that portion being distal to the hinge mechanism, said opened side including a keyboard, a palm rest and a cursor-pointing device whereon layers of translucent elastomer having the same composition as that of the first and second layers being layered and integrated with top portion of keycaps of said keyboard, portions of said palm rest and a command select button of the cursorpointing device; and said first and second layers of translucent elastomer being colored and being configured in combination further to cover corners of said portable computer located distal to said hinge mechanism and proximal to an operating user.

2. A portable computer having a computer housing for improved resistance to scratching, marring and general abuses, said portable computer housing having a display housing rotatably attached to a main housing via a hinge mechanism, said portable computer comprising:

said display housing having a closed side wherein the closed side being consisting of an integral piece, said closed side further having a first translucent elastomer layer integrated with a portion of the closed side and that portion being distal to the hinge mechanism;

said main housing having a closed side wherein the closed side of the main housing being consisting of an integral piece, said closed side of the main housing further having a second translucent elastomer layer integrated with a portion of the closed side of the main housing and that portion also being distal to the hinge mechanism; and said first and second layers of translucent elastomer being configured in combination further to cover corners of said portable computer located distal to said hinge mechanism and proximal to an operating user.

3. The portable computer as claimed in claim 2 wherein said first and second translucent elastomers include one or more colors.

4. The portable computer as claimed in claim 2 wherein said main housing includes an opened side, said opened side including one or more areas whereon user hand or fingers frequently making contact, said one or more areas being integrally layered with a third translucent elastomer.

5. The portable computer as claimed in claim 4 wherein said first, second and third translucent elastomers include one or more colors.

6. The portable computer as claimed in claim 4 wherein said one or more areas include top portions of keycaps of said keyboard.

7. The portable computer as claimed in claim 4 wherein said one or more areas include portions of the palm rest.

8. The portable computer as claimed in claim 4 wherein said one or more areas include a command select button of the cursor-pointing device.

9. The portable computer as claimed in claim 4 further includes a carrying handle disposed in connection with the hinge mechanism, said carrying handle being integrally layered with a translucent elastomer having the same chemical composition as those for said first and second translucent elastomers.

10. A portable computer housing for improved resistance to scratching, marring and general abuses, said portable computer housing having a display housing rotatably attached to a main housing via a hinge mechanism, said portable computer housing comprising:

said display housing having a closed side wherein the closed side being consisting of an integral piece, said closed side further having a first translucent elastomer layer integrated with a portion of the closed side and that portion being distal to the hinge mechanism;

said main housing having a closed side wherein the closed side of the main housing being consisting of an integral piece, said closed side of the main housing further having a second translucent elastomer layer integrated with a portion of the closed side of the main housing and that portion also being distal to the hinge mechanism; and said first and second layers of translucent elastomer being configured in combination further to cover corners of said portable computer located distal to said hinge mechanism and proximal to an operating user.

11. The portable computer housing as claimed in claim 10 wherein said first and second translucent elastomers include one or more colors.

12. The portable computer housing as claimed in claim 10 wherein said portion of the closed side of the main housing having the second translucent elastomer layer includes contact points between said main housing and a generally flat surface on which said main housing typically sits.

13. The portable computer housing as claimed in claim 10 wherein said main housing includes an opened side, said opened side including one or more areas whereon user hand or fingers frequently making contact, said one or more areas being integrally layered with a third translucent elastomer.

14. The portable computer housing as claimed in claim 13 wherein said first, second and third translucent elastomers include one or more colors.

15. The portable computer housing as claimed in claim 13 wherein said opened side of said main housing includes a palm rest wherein said one or more areas including portions of said palm rest.

16. The portable computer housing as claimed in claim 13 further includes a carrying handle disposed in connection with the hinge mechanism, said carrying handle being integrally layered with a translucent elastomer having the same chemical composition as those for said first and second translucent elastomers.

* * * * *